(12) United States Patent
Acar

(10) Patent No.: US 9,972,059 B2
(45) Date of Patent: May 15, 2018

(54) SYSTEMS AND METHODS FOR MEMORIZATION OF AN ELECTRONIC PUBLICATION

(75) Inventor: Gunduzhan Acar, Hutto, TX (US)

(73) Assignee: APPLE INC., Cupertino, CA (US)

( * ) Notice: Subject to any disclaimer, the term of this patent is extended or adjusted under 35 U.S.C. 154(b) by 850 days.

(21) Appl. No.: 13/529,673

(22) Filed: Jun. 21, 2012

(65) Prior Publication Data
US 2013/0342470 A1    Dec. 26, 2013

(51) Int. Cl.
| | |
|---|---|
| *G06F 3/0488* | (2013.01) |
| *G06T 1/00* | (2006.01) |
| *G06F 3/147* | (2006.01) |
| *G09B 5/06* | (2006.01) |

(52) U.S. Cl.
CPC .............. *G06T 1/00* (2013.01); *G06F 3/147* (2013.01); *G09B 5/062* (2013.01); *G09G 2340/14* (2013.01); *G09G 2380/14* (2013.01)

(58) Field of Classification Search
CPC ..... G06F 3/0488; G06F 3/04883; G06F 3/044
USPC ............... 345/156, 169, 173–175, 501, 522, 345/530–534; 715/776; 178/18.01
See application file for complete search history.

(56) References Cited

U.S. PATENT DOCUMENTS

| | | |
|---|---|---|
| 7,152,034 B1 | 12/2006 | Layng et al. |
| 7,641,475 B2 | 1/2010 | Katsuyama et al. |
| 8,065,603 B2* | 11/2011 | Gossweiler et al. .......... 715/227 |
| 8,698,765 B1* | 4/2014 | Keller ............................ 345/173 |
| 8,704,783 B2* | 4/2014 | Davis .................... G06F 3/0488 345/173 |
| 8,826,169 B1* | 9/2014 | Yacoub ................. G06F 3/0488 715/202 |
| 2009/0075247 A1 | 3/2009 | Tucci |
| 2012/0098639 A1* | 4/2012 | Ijas ..................... G06F 3/04883 340/5.51 |

OTHER PUBLICATIONS

Imemorize computer program filed on Jul. 26, 2011.*
Kurzweil 3000 for Windows™ Version 10 QWuick Reference; Kurzweil Education System, 2007, http://www.kurzweiledu.com/files/Kurzwel3000V10/Kurzweil_3000_V10_Quick_Reference.pdf.
The Evolution of eTextbook Content; CourseSmart; Feb. 15, 2011; http://coursesmart.info/blog/?p-358.

* cited by examiner

*Primary Examiner* — Alexander Eisen
*Assistant Examiner* — Mansour M Said
(74) *Attorney, Agent, or Firm* — Fletcher Yoder PC

(57) ABSTRACT

The present approach includes presenting an e-book having content, in which the content includes selected content and non-selected content. The method includes receiving a first prompt to hide the selected content of the e-book and hiding the selected content, in response to the first prompt, while presenting the non-selected content of the e-book. The method further includes receiving a second prompt to reveal the hidden content of the e-book and temporarily revealing the hidden content, in response to the second prompt, while presenting the non-selected content of the e-book.

20 Claims, 9 Drawing Sheets

SYSTEMS AND METHODS FOR MEMORIZATION OF AN ELECTRONIC PUBLICATION

BACKGROUND

The present disclosure relates generally to electronic publications, such as electronic textbooks (e-textbooks) or other electronic books (e-books). More specifically, the present disclosure relates to systems and methods for aiding a reader in the study and/or memorization of electronic publications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic publications, such as electronic textbooks (e-textbooks) and other electronic books (e-books), are becoming a common feature in modern entertainment and education. In education, e-textbooks are gaining popularity due, in part, to the rising concerns over the cost and environmental impact associated with printing, distributing, revising, and disposing of paper textbooks. E-textbooks may also afford a more engaging multimedia experience for the reader than typical textbooks, potentially involving text, static images, dynamic images (e.g., 3D models, animated diagrams, and/or interactive charts), videos, audio clips, and so forth, woven together to immerse the reader in the topic. Like typical textbooks, students may be expected to study and/or memorize portions of the content of an e-textbook, for example, in preparation for a quiz or exam.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The presently disclosed systems and methods enable a reader of an electronic publication, such as an electronic textbook (e-textbook) or other electronic book (e-book), to select portions of the content of the electronic publication for study. The content may include any textual content (e.g., text from the publisher, notes created by the reader, and/or dynamic text from an online source) or graphical content (e.g., static or dynamic images, animations, and/or videos). These selected portions of the content may be initially highlighted (e.g., visually differentiated) from the non-selected portions for study by the reader. Further, the reader may interact with the electronic publication to have these highlighted portions hidden (e.g., obscured by a mark, erased, or otherwise hidden) from view while the non-selected portions of the content remain visible. Using the visible content, the reader may attempt to recall the hidden content from memory. Then, the reader may interact with the a portion of the hidden content of the electronic publication to have that portion of the hidden content temporarily revealed. In certain embodiments, the revealed content may automatically return to a hidden state after a predetermined period of time has passed (e.g., based on a signal from a timer element). In other embodiments, the reader may interact with the revealed content, causing the revealed content to return to a hidden state. In certain embodiments, the highlighted portions of the content, and possibly surrounding non-selected portions of the content, may be automatically converted into a flash card format for further study by the reader.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
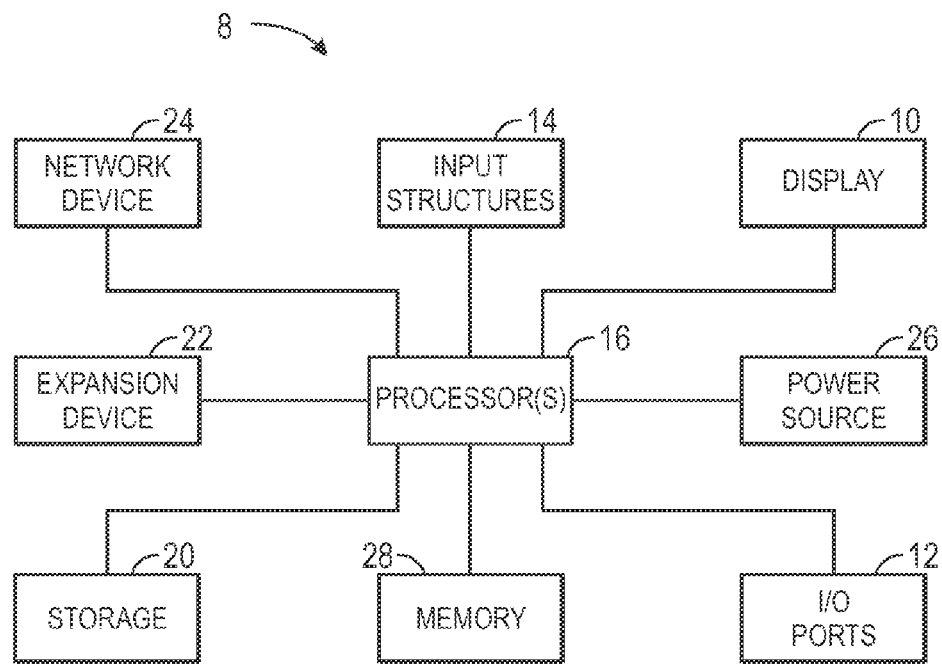
FIG. 1 is a block diagram of components of an example of an electronic device, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A reader of an electronic publication may interact with an electronic publication to initially consume information. The reader may also return to the electronic publication to study and/or memorize content as well. For example, a student may desire to study and/or memorize portions of the content of an e-textbook, for example, in preparation for an upcoming quiz or exam. As such, the student may, for example, initially read an assigned chapter of an e-textbook, and may further consider certain portions of the content particularly relevant. For example, the student may consider a particular term used in the text to be a likely source of a test question, or the student may consider a piece of content as key to understanding an overall concept. Accordingly, the student may interact with the e-textbook to highlight or otherwise emphasize or visually differentiate these identified portions of the content of the e-textbook. As set forth in detail below, the highlighted content may be any visual static or dynamic content of the e-textbook, such as text, notes, images, movies, or any other suitable visual content.

Once the reader has highlighted relevant portions of the electronic publication, the reader may subsequently return to these portions of the electronic publication for study. Presently disclosed embodiments enable the reader to hide selected portions of the content of the electronic publication (i.e., "hidelighting") such that the reader may be able to view and study pages of the e-textbook with the critical information concealed from view. Furthermore, presently disclosed embodiments enable the reader to temporarily reveal the hidden portions of the e-textbook content. In this manner, present embodiments enable the reader to view the surrounding context of a critical piece of information that is hidden, allowing the reader to attempt to recall the hidden content before it is temporality revealed. By providing context for the reader to remember the hidden content, and by enabling the reader to determine whether they have correctly recalled the information by temporarily reviewing the hidden content, present embodiments may improve the reader's ability to memorize both the hidden content as well as the surrounding context content of the e-textbook.

Figure 3:
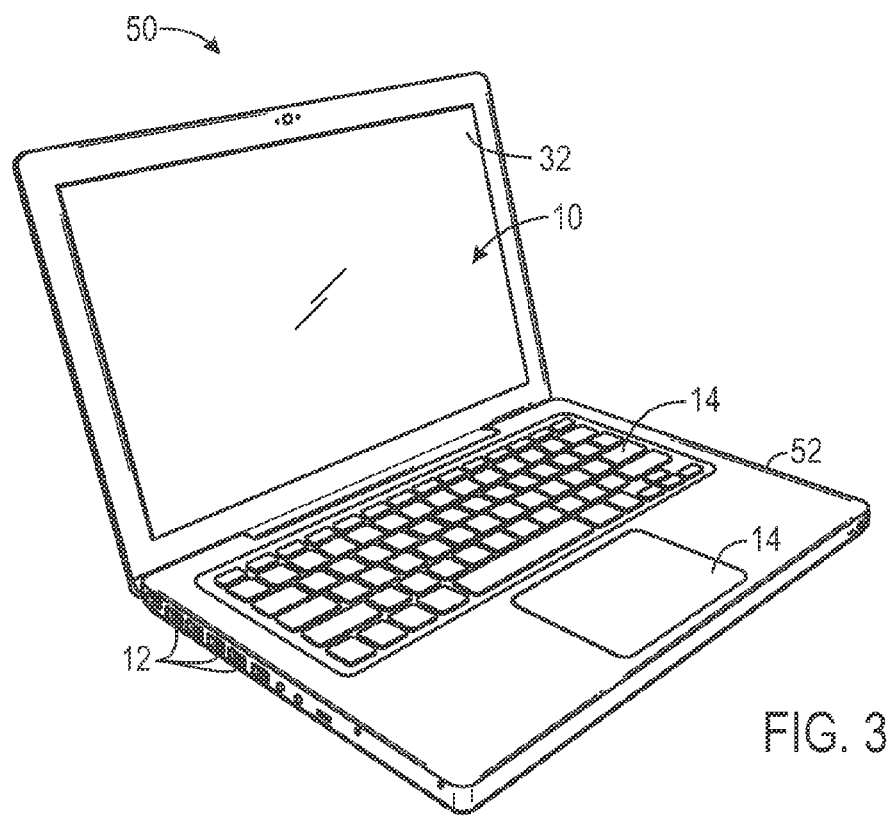
FIG. 3 is a perspective view of an example of a laptop electronic device, in accordance with aspects of the present disclosure.
Figure 2:
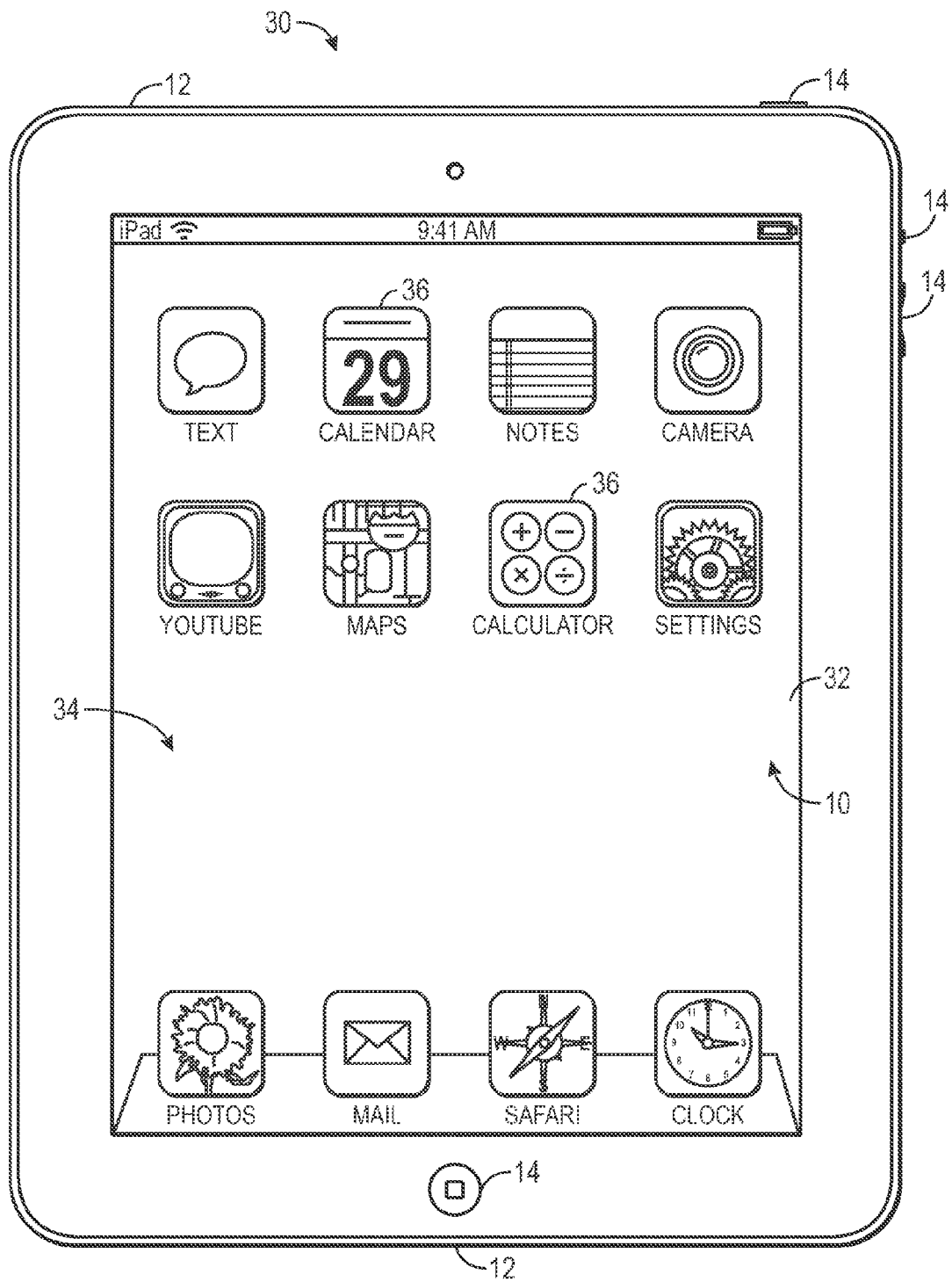
FIG. 2 is a perspective view of an example of a handheld electronic device, in accordance with aspects of the present disclosure.

With the foregoing in mind, a general description is provided below of suitable electronic devices that may be used by a reader to view and interact with an electronic publication. In particular, FIG. 1 is a block diagram depicting various components that may be present in an electronic device suitable for presenting an electronic publication for reading and study, as described herein. FIGS. 2 and 3 respectively illustrate perspective and front views of suitable electronic devices, which may be, as illustrated, a handheld electronic device (e.g., a tablet computer) or other mobile computing device (e.g., a laptop computer).

An example of an electronic device suitable for the techniques described herein may include various internal and/or external components. For example, FIG. 1 is a block diagram illustrating the components that may be present in such an electronic device 8, allowing the electronic device 8 to function. One of ordinary skill in the art will appreciate that the various functional blocks shown in FIG. 1 may comprise hardware elements (including circuitry), software elements (including computer code stored on a computer-readable medium), or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. The display 10 may be an LCD, OLED-type display, or other suitable display device. Additionally, in certain embodiments of the electronic device 8, the display 10 may be provided in conjunction with a touch-sensitive element, such as a touchscreen, that may be used as part of the control interface for the device 8.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 or Firewire™ port, a Thunderbolt™ port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, internal accelerometers, and so forth.

In certain embodiments, an input structure 14 and display 10 may be provided together, such as in the case of a touchscreen where a touch sensitive mechanism is provided in conjunction with the display 10. In such embodiments, the user may select or interact with displayed interface elements via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces (e.g., an e-book user interface), and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more central processing units (CPUs), physics processors, graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, hardware configuration information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be a flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard; any 2G, 3G, or 4G cellular data standard; or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8 and may be rechargeable. Additionally, the power source 26 may include AC power, such as provided by an electrical outlet, and the electronic device 8 may be connected to the power source 26 via a power adapter. This power adapter may also be used to recharge one or more batteries, if present.

With the foregoing in mind, FIG. 2 illustrates an electronic device 8 in the form of a handheld device 30, here a tablet computer. By way of example, the handheld device 30 may be a model of an iPad®, iPod®, or iPhone® available from Apple Inc. of Cupertino, Calif. It should be noted that while the depicted handheld device 30 is provided in the context of a tablet computer, other types of handheld devices (such as media players for playing music and/or video, personal data organizers, handheld game platforms, electronic books, handheld GPS navigation units, and/or combinations of such devices) may also be suitably provided as the electronic device 8. Further, a suitable handheld device 30 may incorporate the functionality of one or more types of devices, such as a media player, a cellular phone, a gaming platform, an electronic book, a personal data organizer, and so forth.

For example, in the depicted embodiment, the handheld device 30 is in the form of a tablet computer that may provide various functionalities (such as the ability to take pictures, record audio and/or video, listen to music, play games, map travel routes, and so forth) in addition to viewing and interacting with electronic texts. As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication.

In the depicted embodiment, the handheld device 30 includes an enclosure or body that protects the interior components from physical damage and shields them from electromagnetic interference. The enclosure may be formed from any suitable material such as plastic, metal, or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a table computer implementation, one or more of the input structures 14 may be configured to invoke a "home" screen or menu to be displayed, to toggle between a sleep and a wake mode, adjust the volume of audible feedback, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touchscreen included in the display 10, or may be selected by a user input structure 14, such as a wheel or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted tablet computer of FIG. 2, an electronic device 8 may also take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 8 in the form of a computer may be a model of a MacBook®, MacBook® Pro, MacBook Air®, iMac®, Mac® mini, or Mac Pro® available from Apple Inc. By way of example, an electronic device 8 in the form of a laptop computer 50 is illustrated in FIG. 3, in accordance with one embodiment of the present disclosure. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications (e.g., an electronic book application) running on the computer 50. For example, a keyboard and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port, Thunderbolt® port, or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications (e.g., an electronic book application having a user interface).

With the foregoing in mind, FIGS. 5-8 illustrate an embodiment of a page 70 of an e-textbook, such as might be presented on the electronic device 8 (e.g., tablet computer 30 and/or laptop computer 50). In particular, FIGS. 5-8 illustrate the page 70 of the e-textbook during various stages of the embodiment of the "hidelighting" process 60 illustrated in FIG. 4. As such, FIGS. 5-8 may generally incorporate a number of common elements as well as distinct elements corresponding to the particular portion of the process 60 being illustrated.

Figure 4:
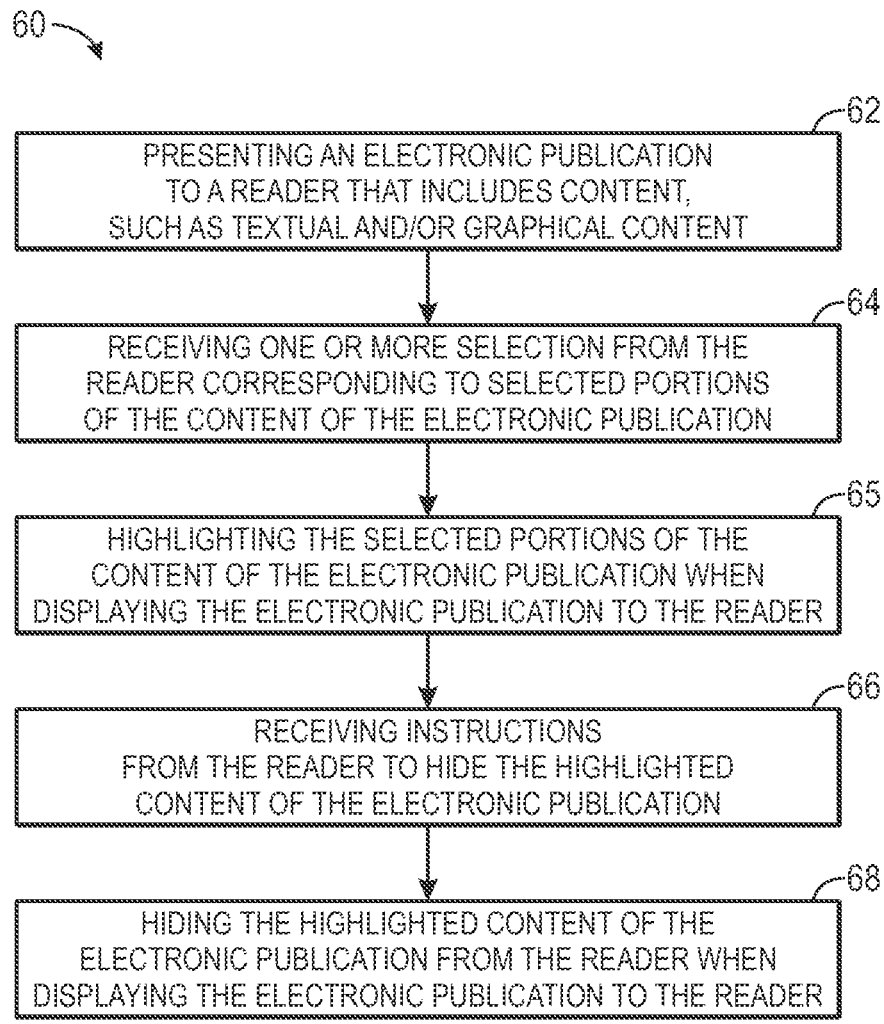
FIG. 4 is a flow diagram illustrating an embodiment of a process by which a reader may select or highlight portions of an electronic publication for memorization, in accordance with aspects of the present disclosure.
Figure 5:
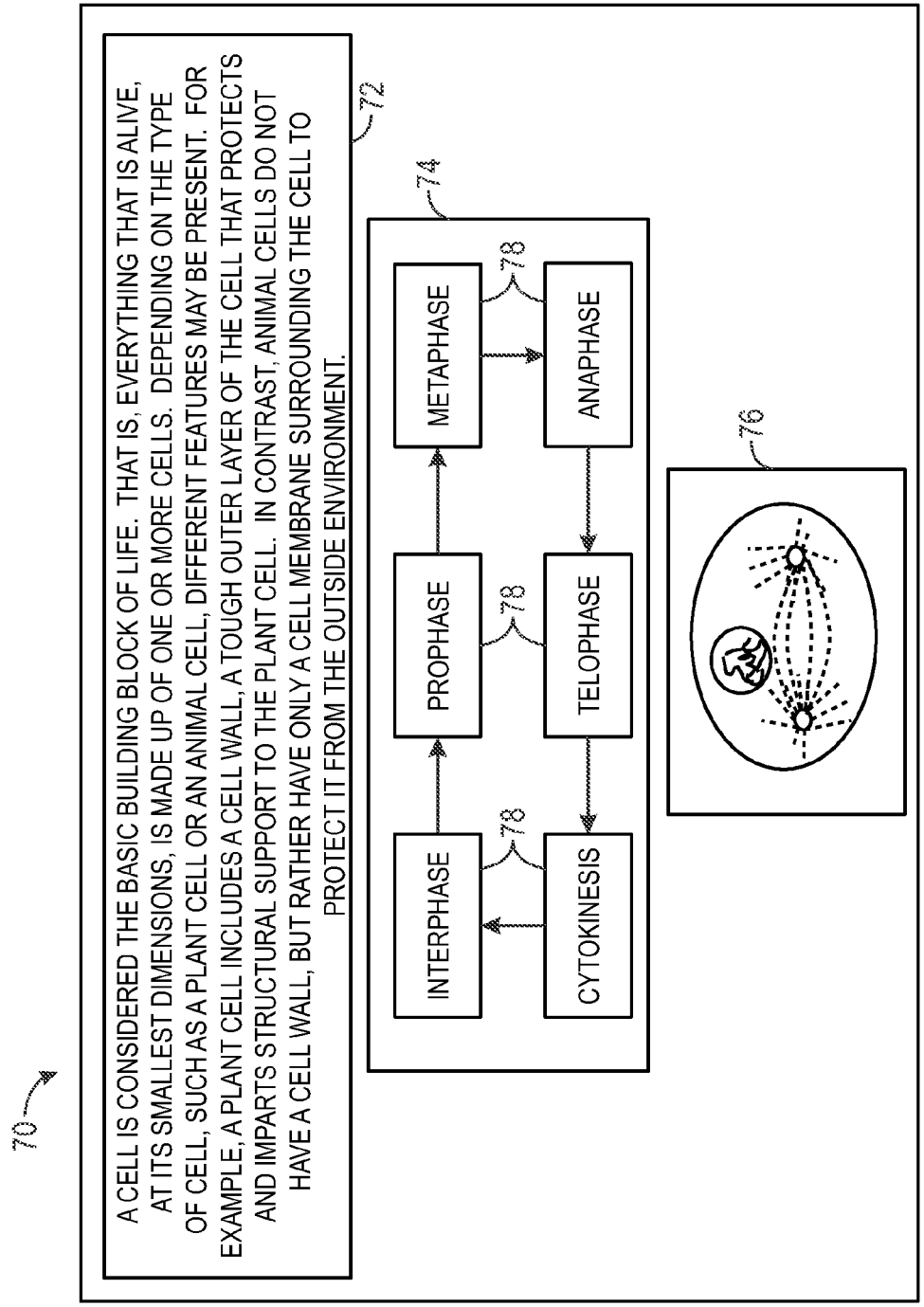
FIG. 5 is an illustration of an example of an electronic publication, in accordance with aspects of the present disclosure.

The "hidelighting" process 60 illustrated in FIG. 4 begins with the electronic device 8 (e.g., tablet computer 30 and/or laptop computer 50) presenting (block 62) an electronic publication (e.g., a portion of an e-textbook or other suitable electronic document or publication) to a reader. For example, the electronic device 8 may present a page 70 of an e-textbook, as illustrated in FIG. 5. The illustrated page 70 of the e-textbook has a number of different types of content, including textual content (e.g., text element 72) and graphical elements (e.g., interactive image 74 and movie 76), all pertaining to the basics of the biological cell in the depicted example. It should be appreciated that these types of content are merely non-limiting examples and that any static or dynamic (e.g., changing, regularly updated, and/or interactive) content of an electronic publication may be suitable for use with the present technique.

The text element 72 may include descriptive text explaining a particular concept. The contents of text element 72 may be static or dynamic. For example, based on newer or updated versions of the e-textbook, the contents of the text element 72 may automatically be updated through communication with a remote server. Additionally, for example, the contents of the text element 72 may also be interactive such that a reader may be able to select or indicate a particular term from the contents of the text element 72 and have a definition of the term be automatically presented (e.g., from a dictionary in an appendix of the e-textbook). Furthermore, in certain embodiments, the text element 72 may include links (e.g., hyperlinks or other navigational links) that a reader may use to access other materials (e.g., via the Internet) related to a particular topic.

The illustrated interactive image 74 of the page 70 includes a number of interactive elements 78 that may be used to instruct the reader. For example, the depicted interactive image 74 includes interactive elements 78 pertaining to the various steps of biological cell division. Using a user input structure 14 of the electronic device 8 (e.g., a touchscreen, touchpad, mouse, or other suitable input device) a reader may interact with the interactive element 78 of the interactive image 74. Upon receiving user interaction, the interactive elements 78 may alter the appearance of the interactive element (e.g., alter the appearance of the element and/or present additional information regarding the element). In certain embodiments, the interactive image 74 may be animated and, accordingly, the appearance of the interactive 78 may be altered on a regular time interval in order to convey the steps of a process (e.g., cell division, nitrogen cycle, electrical circuits, and so forth) to the reader. In other embodiments, the page 70 of the e-textbook may, additionally or alternatively, include static images that may not substantially change appearance with user interaction, with the notable exception of the "hidelighting" process discussed below.

The illustrated movie 76 of the page 70 of the e-textbook may be any suitable movie or video file. For example, the illustrated movie 76 pertains to biological cell division. In certain embodiments, upon presenting the page 70 to the reader, the movie 76 may automatically play without user interaction. In other embodiments, the movie 76 may be responsive to interactions from user input structures 14 in order to play, pause, stop, or otherwise control the presentation of the movie 76. In other embodiments, the interactive image 74 may operate in conjunction with the movie 76 such that the portions of the movie 76 presented to the reader correspond to a reader's interaction with other content (e.g., the interactive element 78 of the interactive image 74).

Turning once again to FIG. 4, the next step in the illustrated "hidelighting" process 60 involves the electronic device 8 receiving (block 64) one or more selections from the reader corresponding to portions of the content (e.g., the various textual and graphical elements) of the electronic publication. That is, the reader may utilize a user input structures 14 of the electronic device 8 (e.g., a touchscreen, touchpad, mouse, or other suitable input structure 14) to select or highlight particular terms. In certain embodiments, the reader may interact with the e-textbook (e.g., via user inputs 14) by selecting a single word, a phrase or group of words, portions of an image or movie, and so forth, using a touch, a swipe, a mouse click, or other suitable input gesture. For example, FIG. 6 illustrates the page 70 of the electronic publication illustrated in FIG. 5, in which the reader is providing input 79 (e.g., via a user input structure 14) to select and highlight a portion of the text element 72.

Turning once more to FIG. 4, once the electronic device 8 has received one or more content selections from the reader, the electronic device may highlight (block 65) the selected portions of the content when displaying the electronic publication to the reader. For example, turning again to FIG. 6, the page 70 has various portions of the content highlighted. The page 70 illustrated in FIG. 6 includes a text element 72 having a number of terms that have been selected based on input (e.g., input 79) received from the reader. By specific example, the illustrated text element 72 includes highlighting of the terms: cell(s), cell wall, and cell membrane. Furthermore, it should be appreciated that the appearance of the highlighting may vary across different implementations. For example, in certain embodiments, the selected portions of the content 80 may be visually differentiated so that they appear as if they have been marked over with an actual highlighter. In other embodiments, the selected portion of the content 80 may be highlighted by a dashed box (e.g., illustrated in FIG. 6), or other suitable visual distinction from the remainder of the content of the page 70. Additionally, in certain embodiments, different highlighter colors may be used by the reader to distinguish between different types of highlighted content. For example, the reader may use differing colors to denote relative priority (e.g., red for the most important concepts, blue for the next most important concepts, and so forth), group topics (e.g., red is for biology and blue is for chemistry), group assignments (e.g., red is material for the first exam, blue is for the second exam, etc.), and so forth.

The page 70 of the e-textbook may also include elements created by the reader. For example, as illustrated in FIG. 6, page 70 includes a reader note 82 created by the reader (e.g., via user input structures 14) to provide additional information for study (e.g., based on information received in lecture or from another source) to supplement the contents of the page 70. The note 82 illustrated in FIG. 6 include a supplemental fact regarding biological cells. Like the text element 72, portions of the reader note 82 may be selected by the reader (e.g., using one or more user input devices 14) to provide highlighted content 80.

Figure 6:
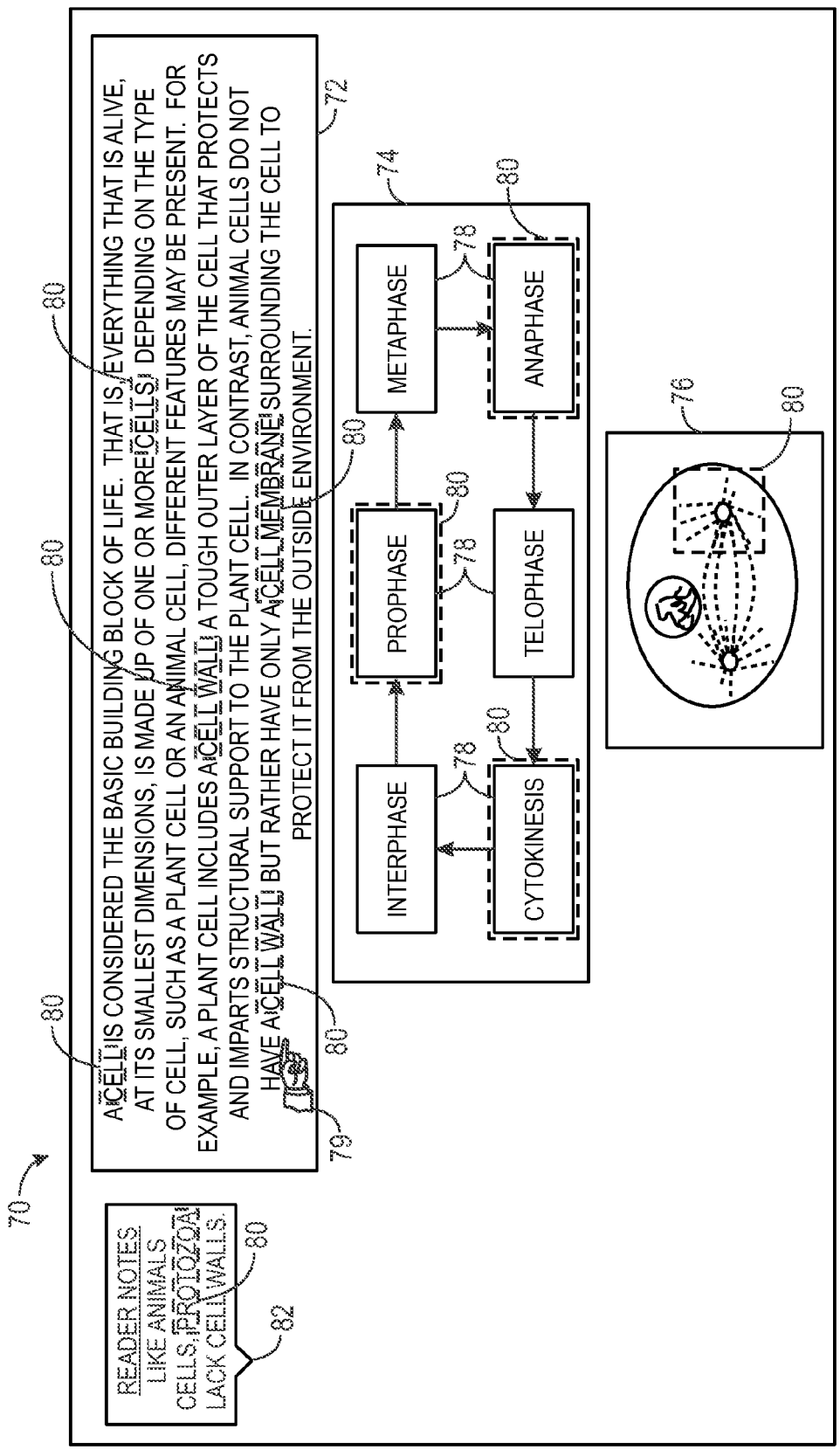
FIG. 6 is an illustration of the electronic publication of FIG. 5 having portions of the content highlighted by the reader, in accordance with aspects of the present disclosure.

Similarly, the interactive image 74 illustrated in FIG. 6 includes certain interactive elements 78 that have been selected as highlighted content 80. Like the text element 72, the reader may utilize a user input structures 14 of the electronic device 8 (e.g., a touchscreen, touchpad, mouse, or other suitable input structure 14) to select and highlight particular terms that appear important to the reader. In particular, the illustrated interactive image 74 has three particular phases of cell division selected as highlighted content 80, namely prophase, anaphase, and cytokinesis. For example, during lecture, an instructor may inform the reader these particular phases of cell division may be included in an upcoming exam and, accordingly, the reader may select the interactive elements 78 corresponding to the phases from the interactive image 74 as highlighted content 80 for later review.

Additionally, the reader may also utilize the user input devices 14 to select portions of the movie 76 as highlighted content 80. For example, in certain embodiments, the reader may highlight portions of a frame of the movie, portions of a series of frames of the movie, entire frames of the movie, or the entire movie itself. The illustrated movie 76 includes a portion of a series of frames having been selected as highlighted content 80. For example, for the movie 76 the highlighted content 80 may represent a particular portion of the cell (e.g., an organelle of the cell) that is illustrated through portions of the biological cell division process illustrated in the movie 76.

The next step in the "hidelighting" process 60 illustrated in FIG. 4 involves the electronic device 8 receiving (block 66) instructions to hide the selected content. That is, after initially selecting portions of the content of the page 70 (e.g., in block 64) to produce the highlighted content 80 (e.g., in block 65), the reader may initially study the page 70 with the highlighted content 80 visible. However, subsequently, the reader may select (e.g., via an input structure 14) to have some or all of the highlighted content 80 hidden from view while the remainder of the page 70 continues to be visible to the reader. For example, the reader may select an option to hide all or a portion of the highlighted content during a study session.

By further example, in certain embodiments, the reader may choose to hide a particular group of highlighted content based on the aforementioned color coding. That is, the reader may select to have all of the red highlighting hidden, in which the red highlighting corresponds to the most important topics, a particular subject, or material for a particular exam. Additionally, in certain embodiments, the reader may provide an amount of time that the reader desires the content to remain hidden (e.g., for the study session, for a designated period of time, until a prompt is received from the reader, until the electronic device 8 is powered down, etc.)

The next step in the "hidelighting" process 60 illustrated in FIG. 4 involves the electronic device 8 hiding (block 68) the highlighted portions 80 of the content of the page 70 when presenting the electronic publication to the reader. For example, turning to FIG. 7, the page 70 illustrated in FIGS. 5 and 6 is illustrated once more. In contrast to FIG. 6, instead of the highlighted content 80, the page 70 of FIG. 7 includes hidden content 84. In other words, the page 70 of FIG. 7 has the portions of the text element 72, the interactive image 74, and the movie 76 that were previously highlighted (e.g., highlighted content 80) now hidden from the reader's view (e.g., hidden content 84). That is, the illustrated hidden content 84 generally corresponds to all or some of the highlighted content 80 selected by the reader in block 64.

Figure 7:
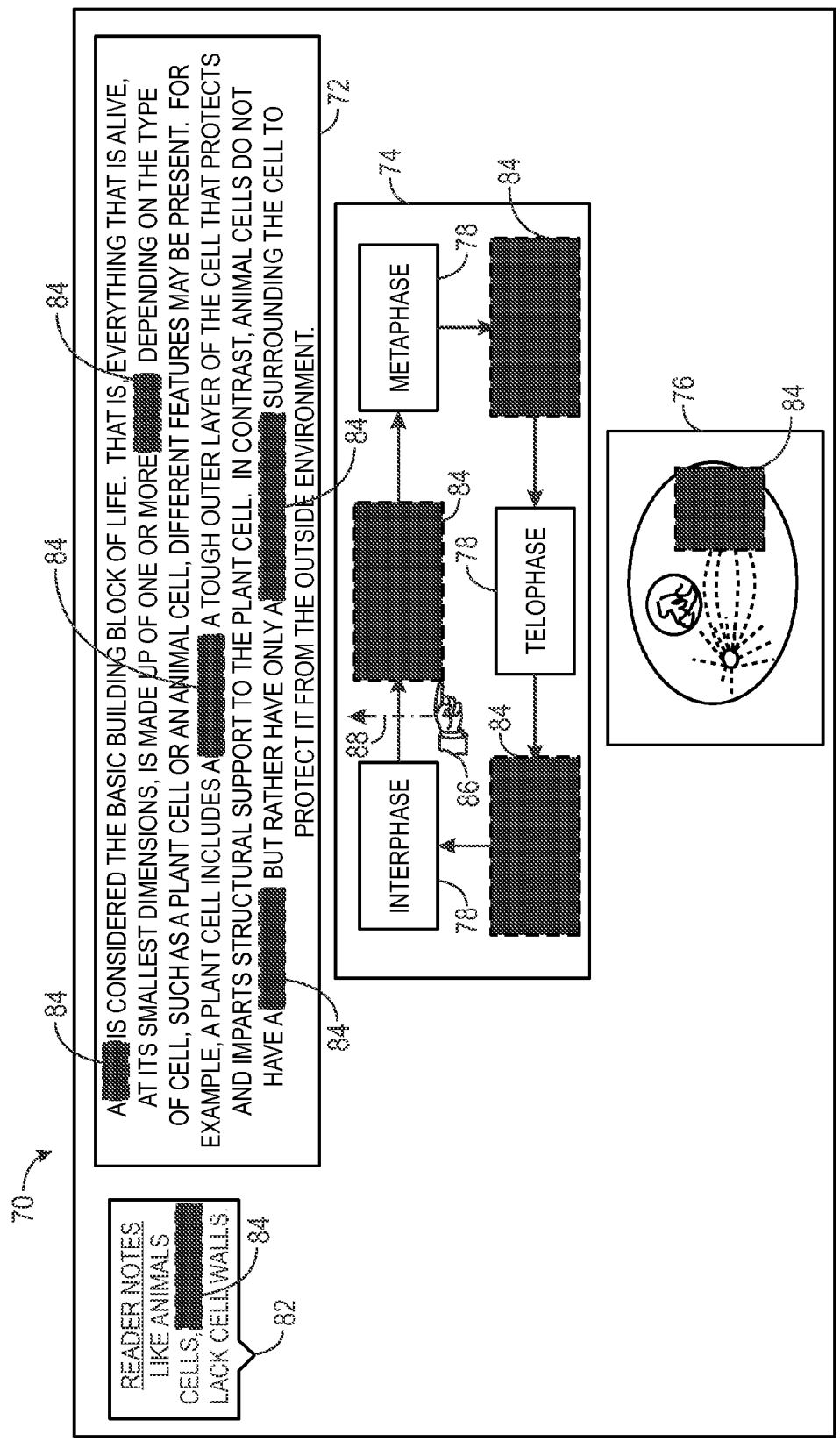
FIG. 7 is an illustration of the electronic publication of FIG. 6, having the highlighted portions hidden from the reader's view, in accordance with aspects of the present disclosure.

In particular, the page 70 of FIG. 7 includes hidden content 84 in the form of hidden textual content in the text element 72 and user notes 82, as well as hidden graphical content of the interactive image 74 and the movie 76. It should be appreciated that the appearance of hidden content 84 may vary with implementation. For example, the hidden content 84 may be disposed behind an opaque box, as illustrated. In other embodiments, the hidden content 84 may appear to have been marked through with an opaque marker. Furthermore, in certain embodiments, the visibility of the hidden content 84 may vary over time. That is, after initially selecting the highlighted content 80, with each subsequent viewing of the page 70, the highlighted content 80 may become increasingly less visible, encouraging the reader to memorize the highlighted content 80 before it becomes completely hidden content 84. For the interactive image 74 and the movie 76, in certain embodiments, portions of the image or graphic outside of the hidden content 84 may function normally (e.g., play, animate, etc.) with the hidden content 84 removed from the reader's view.

Figure 8:
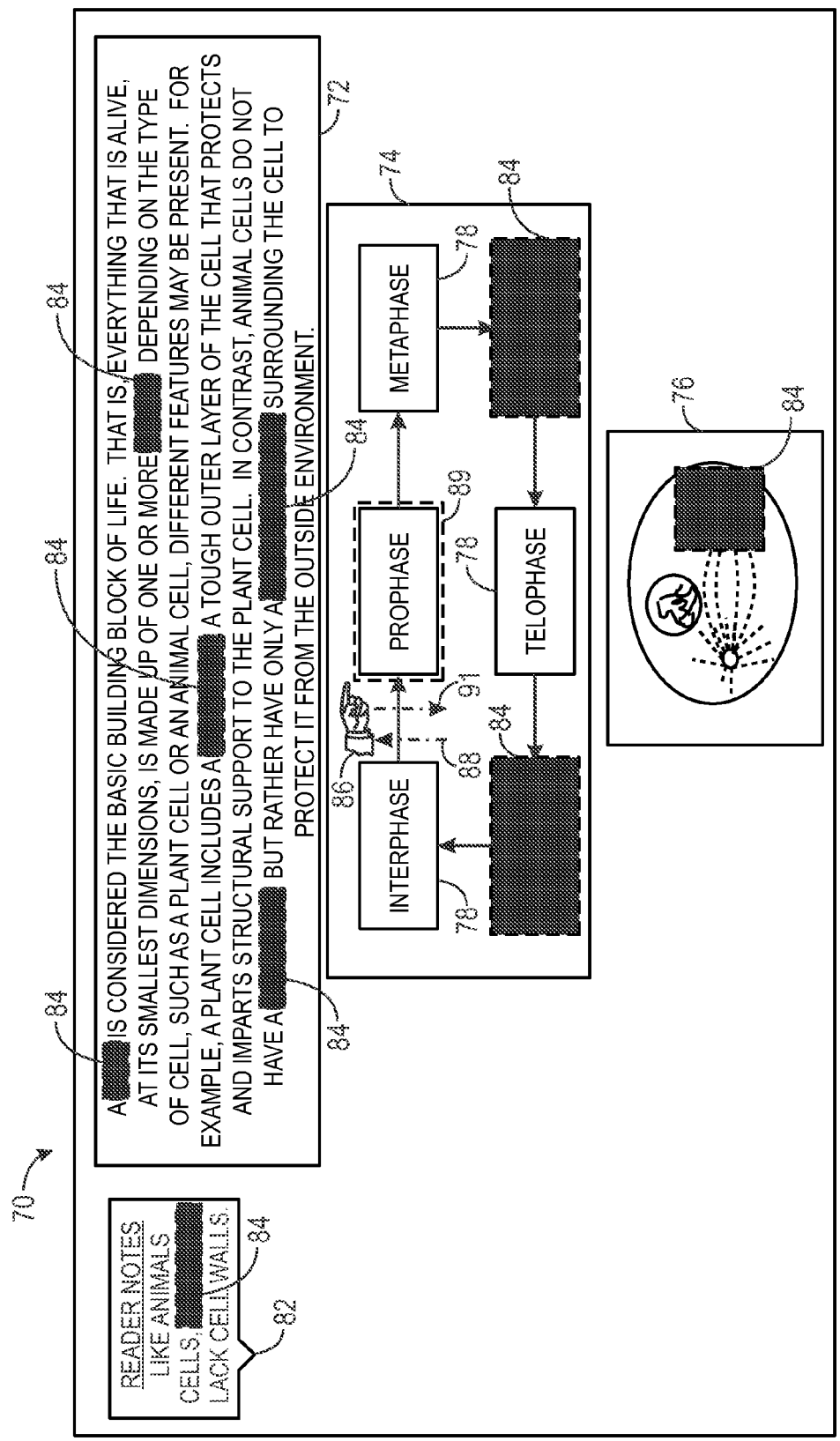
FIG. 8 is an illustration of the electronic publication of FIG. 7, having a portion of the hidden content temporarily revealed, in accordance with aspects of the present disclosure.
Figure 9:
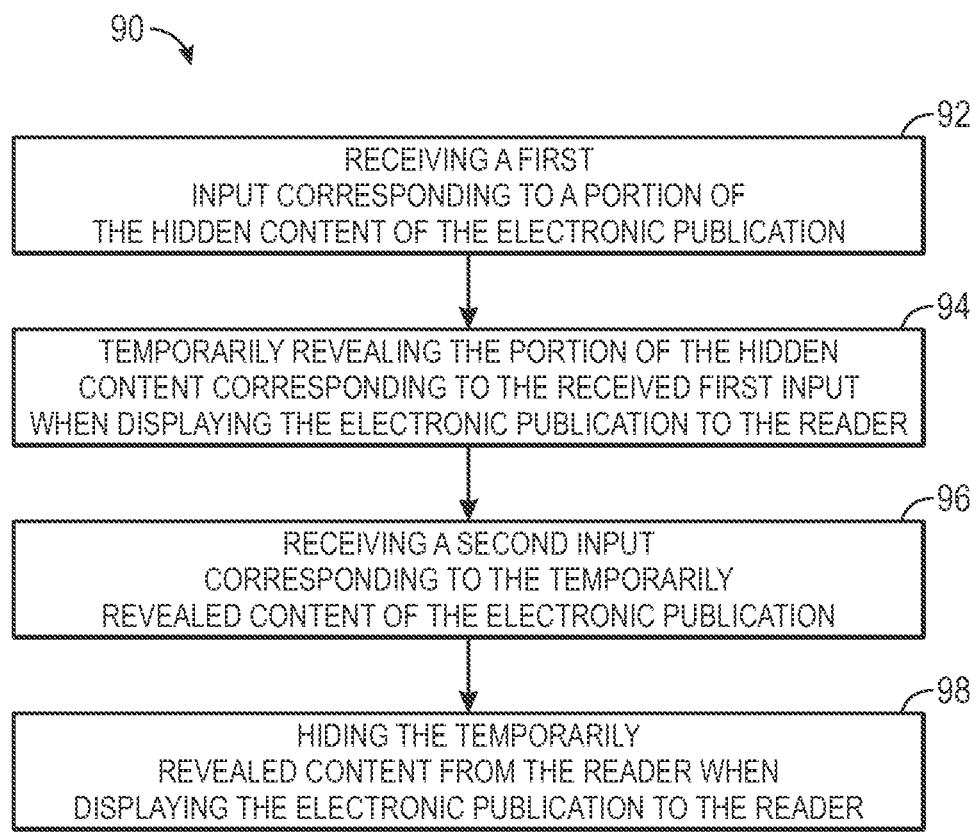
FIG. 9 is a flow diagram illustrating an embodiment of a process by which a reader may reveal the hidden portions of the electronic publication, in accordance with aspects of the present disclosure.

With the foregoing in mind, FIG. 9 include the process 90 by which an electronic device 8 may utilize the page 70 of FIGS. 7 and 8 to assist a reader in studying and or memorizing the hidden content 84. The illustrated process 90 begins with the electronic device 8 (e.g., tablet computer 30 and/or laptop computer 50) that is presenting the page 70 of FIG. 7 to the reader receiving (block 92) a first input corresponding to a portion of the hidden content 84. For example, the reader may use one of the user input structures 14 (e.g., a touchscreen, touchpad, mouse, or other suitable input structure 14) to select or interact with a particular portion of the hidden content 84. By specific example, as illustrated, a reader may use a finger 86 to swipe 88 a portion of the hidden content 84 of the interactive image 74.

Upon receiving the first input, the electronic device 8 may temporarily reveal (block 94) the hidden content corresponding to the received first input of the reader. That is, once the user has used an input structure 14 to select a particular portion of the hidden content 84, the hidden content 84 may temporarily be visible to the reader. For example, once a reader has utilized a touch, tap, swipe, or other suitable gesture on a touchscreen input structure 14 that indicates a selection of the first hidden content 84 of text element 72, the electronic device 8 may gradually reveal or immediately reveal the underlying information. For example, in certain embodiments, the hidden content 84 may be gradually made visible (e.g., fade in or materialize) over the block or mark hiding the content or the block or mark hiding the content may gradually become more transparent (e.g., fade out or dissolve) to reveal the underlying content. Likewise, in response to the reader prompt, the block or mark may simply be removed, gradually or otherwise, to reveal the previously hidden content. By specific example, as illustrated in FIG. 8, once the reader has used the finger 86 to swipe 88 the hidden content 84 of the interactive image 74, the portion of the hidden content 84 becomes the revealed content 89, which is visible to the reader. It should be appreciated that present embodiments enable the reader to view this revealed content in the context of the original material of the page 70, potentially enhancing the reader's ability to retain the information.

The process 90 continues when the electronic device 8 receives (block 96) a second input corresponding to the temporarily revealed hidden content 84. In certain embodiments, the second input may correspond to input provided by the reader via a user input structure 14. For example, after initially selecting a particular portion of the hidden content 84 to reveal in blocks 92 and 94, the electronic device 8 may receive another input from the reader via the user input structure 14 indicating the readers desire to return the revealed portion of the hidden content 84 back to a hidden state. As illustrated in FIG. 8, in certain embodiments, the first input from the reader via a touchpad or touchscreen user input structure 14 in block 92 may correspond to a swipe 88 in a first direction (e.g., a swipe from bottom to top or a swipe from right to left). Accordingly, the input from the reader indicating the reader's desire to re-hide the revealed content may correspond to a swipe 91 in a second direction, different than the first (e.g., a swipe from top to bottom or a swipe from left to right). It should be appreciated that, in certain embodiments, the system may be state-dependent so that the same input or gesture by the reader may be used to both reveal and re-hide the content. It should also be appreciated that swiping represents one example of a gesture that may be used, and that similar strategies may be utilized with other type of suitable gestures (e.g., tapping, dragging, or other suitable gesture) or inputs (e.g., clicking with the mouse, providing accelerometer or gyroscopic input by moving the entire electronic device 8, and so forth).

In other embodiments, the second input described by block 96 of the process 90 may correspond to an input that is provided by a software or hardware timer element. For example, in the configuration settings for the e-textbook application and/or the electronic device 8, the reader may have the option to specify a certain amount of time that the reader desires the hidden content 84 to be revealed before returning to a hidden state. For example, the amount of time may be a flat value provided by the reader, such as a length of time to reveal hidden content (e.g., in seconds). In certain embodiments, the reader may choose a numerical value (e.g., 1-5 seconds) for an amount of time per word (or screen area percentage) that hidden content should be revealed before being restored to a hidden state. In other embodiments, the reader may set of values for the amount of time that hidden content is revealed based on the difficulty of certain subject matter (e.g., reveal math equations longer than other content), which may correspond to different colors of highlighting, as discussed above. In still other embodiments, the user may set a program for the amount of time to reveal hidden content, in which the hidden content may be revealed the greatest length of time the first time it is revealed, and may be revealed for a reduced length of time with each subsequent viewing. Accordingly, once the specified amount of time has passed after reviewing the hidden content 84, the timer may supply and input to the e-textbook software and/or electronic device 82 to return the revealed content to a hidden state. This timer may be implemented in the form of software and/or hardware timekeeping mechanisms.

Accordingly, once the electronic device 8 has received the second input either from the reader or from some automated timing mechanism, the electronic device 8 may hide (e.g., re-hide) (block 98) the temporarily revealed portion of the hidden content 84. In certain embodiments, the electronic device 8 may gradually or immediately re-hide the underlying information. For example, in certain embodiments, the temporarily revealed hidden content 84 may be gradually made invisible (e.g., fade out or dissolve) or a block or mark may move into the foreground (e.g., fade in or materialize) to obstruct the content from view. It should be appreciated that once the temporarily revealed content is once more hidden, the reader may once again use a user input structure 14 to provide the first input of block 92 to repeat the process again. Furthermore, it should be appreciated that the reader may interact with more than one portion of the hidden content 84, and the process 90 may ensue for each piece of the hidden content that is temporarily revealed. Additionally, in certain embodiments, the reader may also gradually unselect content (e.g., unselect portions of the highlighted content) previously selected by the reader for study as the reader feels that he or she is ready to discontinue study of this content.

Figure 10:
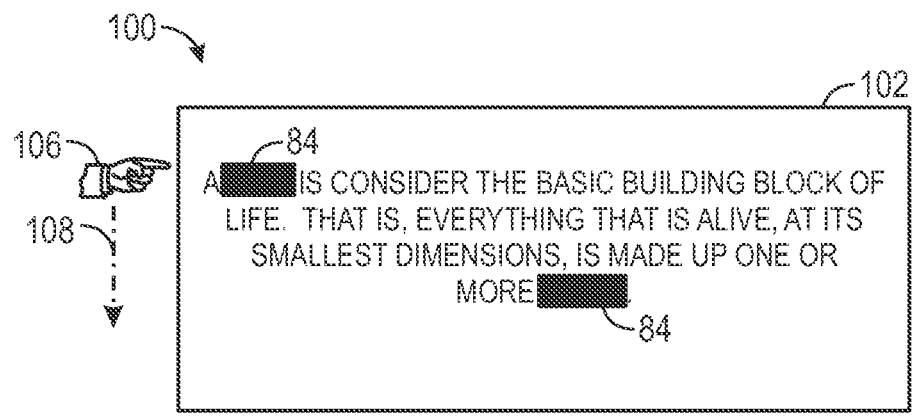
FIG. 10 is an illustration of one side of a flash card generated from the portions of the electronic publication highlighted by the reader, in accordance with aspects of the present disclosure.
Figure 11:
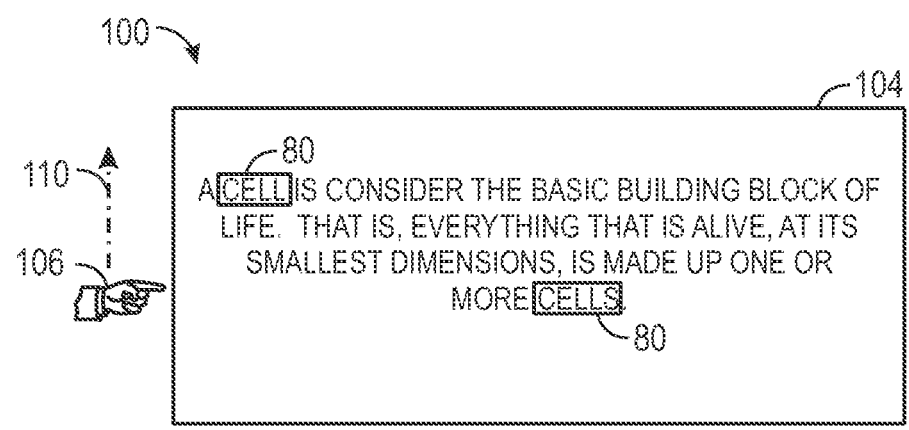
FIG. 11 is an illustration of another side of the flash card illustrated in FIG. 10, in accordance with aspects of the present disclosure.

Additionally, present embodiments also enable the automatic export of highlighted content 80 and surrounding contextual information into a flash card format. For example, FIGS. 10 and 11 illustrate an example of a flash card 100 having a hidden side 102 and a revealed side 104, in which only one of the two sides may be visible to the reader at any point in time. In certain embodiments, the contents of the flash card 100 may be automatically populated based on selections made by the reader when selecting highlighted content 84 in block 64. Similar to the hidden content 84 illustrated in FIG. 7, the reader may use a user input structure 14 to provide a first gesture to change the flash card 100 from the hidden state 102 to the revealed state 104. By specific example, as illustrated in FIG. 10 the reader may use a finger 106 and an input structure 14 (e.g., a touchpad or touchscreen) to provide an input swipe 108 to transform the flash card 100 to the revealed state 104. Furthermore, once the flash card 100 is in the revealed state 104, the reader may provide a different or the same gesture (e.g., swipe 110) to change the flash card 100 back to the hidden state 102. In other embodiments, the input to change the appearance of the flash card 100 from the revealed state 104 back to the hidden state 102 may be provided by a timer mechanism, as discussed above with respect to block 96 of FIG. 9. It should be appreciated that any number of suitable animations (e.g., flipping, rotating, dissolving, or other suitable animation) may be used to provide the flash card 100 with a particular look and feel as it is transitioning between the hidden state 102 and the revealed state 104.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic book (e-book) system, comprising:
a memory storing one or more routines; and
a processing component configured to execute the one or more routines stored in the memory, wherein the one or more routines, when executed by the processing component provide an e-book user interface, wherein the e-book user interface is configured to:
    display e-book content;
    receive a first input selecting a group of portions of the e-book content;
    receive a second input prompting the e-book user interface to hide the group of the portions of the e-book content;
    receive a third input, via the e-book user interface, to assign a color to the group of the portions;
    in response to the third input, generate a graphic configured to obscure display of the group of portions of the e-book content, wherein the graphic displays the assigned color; and
    in response to the third input, hide the group of portions of the e-book content, by:
        displaying the graphic over the group of portions of the e-book content, such that the graphic obscures display of the group of portions of the content while a remaining unselected portion is not obscured by the graphic, wherein the unselected portion is displayed in a common position both when the graphic is displayed and when the graphic is not displayed.

2. The system of claim 1, wherein the e-book user interface is configured to visually highlight the group of portions of the content of the e-book when displaying the e-book.

3. The system of claim 2, wherein the e-book user interface is configured to receive a fourth input related to the group of portions of the content that is hidden.

4. The system of claim 3, wherein the e-book user interface is configured to remove the graphic in response the fourth input.

5. The system of claim 4, wherein the e-book user interface is configured to display the graphic over the group of portions in response to receiving a fifth input.

6. The system of claim 5, wherein the fifth input comprises input from a user input device or from a timer element.

7. The system of claim 3, wherein the e-book user interface is configured to make the group of portions of the content that is hidden gradually more visible over time to reveal the group of portions in response the second input.

8. The system of claim 1, wherein the graphic is configured to become increasingly opaque with each subsequent hide obscure the display of the group of portions of the e-book content such that the group of portions becomes increasingly less visible with each subsequent hide.

9. The system of claim 1, wherein the color denotes relative priority of content of the group of portions.

10. The system of claim 1, comprising a fourth input, wherein the fourth input provides an amount of time that the graphic obscures the group of portions.

11. The system of claim 10, wherein the amount of time is based on a designated period of time, until a prompt is received via an input, until the e-book system is powered down, or a combination thereof.

12. A non-transitory, computer-readable medium configured to store one or more instructions executable by one or more processors of an electronic device, that cause the one or more processors to:
    present e-book content, wherein the e-book content comprises selected content and remaining non-selected content;
    receive a first prompt to hide the selected content of the e-book content;
    receive a second prompt to indicate an amount of time to hide the selected content of the e-book content;
    hide the selected content in response to the second prompt while presenting the non-selected content of the e-book, wherein hiding the selected content comprises displaying one or more obscuring graphics over the selected content, such that the graphics obscure a view of the selected content without changing a position of the remaining non-selected content, wherein at least a portion of the non-selected content is not obscured by the one or more obscuring graphics;
    reveal the selected content of the e-book content after the amount of time has passed.

13. The medium of claim 12, comprising instructions that cause the one or more processors to re-hide the revealed selected content based upon, a prompt from a user input device or a timer element.

14. The medium of claim 13, wherein the timer element is configured to trigger the re-hide after a user-configured amount of time.

15. The medium of claim 14, wherein the user-configured amount of time is based on a size or quantity of the selected content or a topic of the selected content.

16. The medium of claim 14, comprising re-hiding the temporarily revealed selected content while presenting the non-selected content of the e-book.

17. The medium of claim 12, wherein the amount of time to hide the selected content is based on a complexity of subject matter of the selected content or a screen area of percentage covered by the selected content.

18. A non-transitory, computer-readable medium configured to store one or more instructions executable by the processor of an electronic device, the instructions comprising:
    instructions to present electronic publication content;
    instructions to receive a first input identifying a first portion of the electronic publication content for memorization;
    instructions to display the first portion of the electronic publication content for a time period;
    instructions to present an interactive mark disposed over the first portion after the time period has elapsed when presenting the electronic publication content, wherein the interactive mark is configured to hide the first portion by visually obscuring the first portion without changing a position of a remaining second portion of the electronic publication content, wherein the second portion is not visually obscured by the interactive mark; and instructions to, based upon a second input, remove the interactive mark to unhide the first content.

19. The medium of claim 18, wherein the second input comprises an input provided via a timer element, wherein the timer element is configured to provide the second input after a user-configured time period has passed after receiving the third input.

20. The medium of claim 18, wherein the time period is reduced when the first portion is subsequently hidden.

* * * * *

UNITED STATES PATENT AND TRADEMARK OFFICE
CERTIFICATE OF CORRECTION

PATENT NO. : 9,972,059 B2  
APPLICATION NO. : 13/529673  
DATED : May 15, 2018  
INVENTOR(S) : Acar Page 1 of 1

It is certified that error appears in the above-identified patent and that said Letters Patent is hereby corrected as shown below:

In the Claims

Column 13, Line 50 (Claim 4) - insert --to-- between "response" and "the".

Column 13, Line 63 (Claim 7) - insert --to-- between "response" and "the".

Signed and Sealed this  
Twenty-sixth Day of February, 2019

Andrei Iancu  
*Director of the United States Patent and Trademark Office*